(12) United States Patent
Yamazaki

(10) Patent No.: US 11,640,567 B2
(45) Date of Patent: May 2, 2023

(54) INFORMATION PROCESSING DEVICE AND SETUP OPERATION MODIFICATION METHOD

(71) Applicant: FUJITSU LIMITED, Kawasaki (JP)

(72) Inventor: Takashi Yamazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/231,079

(22) Filed: Apr. 15, 2021

(65) Prior Publication Data

US 2021/0232993 A1    Jul. 29, 2021

Related U.S. Application Data

(63) Continuation of application No. PCT/JP2018/048485, filed on Dec. 28, 2018.

(51) Int. Cl.
    *G06Q 10/06* (2012.01)
    *G05B 19/418* (2006.01)
    *G06Q 10/0633* (2023.01)

(52) U.S. Cl.
    CPC ... *G06Q 10/0633* (2013.01); *G05B 19/41865* (2013.01); *G05B 2219/31054* (2013.01)

(58) Field of Classification Search
    None
    See application file for complete search history.

(56) References Cited

U.S. PATENT DOCUMENTS 5,119,318 A * 6/1992 Parades ............... G06N 5/04
                                            706/904
5,237,736 A * 8/1993 Inoue ................ B23Q 7/1415
                                             29/33 P
(Continued)

FOREIGN PATENT DOCUMENTS

JP       2006-287075 A      10/2006
JP       2011034432 A   *   2/2011
(Continued)

OTHER PUBLICATIONS

Frepple.org "How to optimize your machine setup time when scheduling your production" (2019) (https://frepple.org/2019/10/28/how-to-optimize-your-machine-setup-time-when-scheduling-your-production/) (Year: 2019).*

(Continued)

*Primary Examiner* — Sujay Koneru
(74) *Attorney, Agent, or Firm* — Fujitsu Patent Center

(57) ABSTRACT

An information processing device includes a memory, and a processor coupled to the memory and configured to rearrange setup operations with respect to an initial input order according to which products are to be input to a processing line including a plurality of lines to which a product that requires a setup operation and a processing operation is to be input, setup operations being not executed with the setup operations overlapped with each other in the plurality of lines, determine a processing completion time of the processing line based on the rearranged setup operations, and determine, as planning data, an order of setup operations that achieves a processing completion time less than a processing completion time of the initial input order among the processing completion time calculated.

10 Claims, 18 Drawing Sheets

(56) References Cited

U.S. PATENT DOCUMENTS

| | | | | |
|---|---|---|---|---|
| 5,553,376 | A * | 9/1996 | Solanki | H05K 13/0417 29/721 |
| 2002/0193972 | A1 * | 12/2002 | Kudo | G05B 19/41885 703/1 |
| 2003/0110069 | A1 * | 6/2003 | Nishizono | G06Q 10/06 705/7.14 |
| 2005/0055105 | A1 * | 3/2005 | Wu | G05B 19/41865 700/1 |
| 2005/0055255 | A1 * | 3/2005 | Soo | G06Q 10/06312 705/7.22 |
| 2008/0010109 | A1 * | 1/2008 | Ide | H04L 43/0817 705/7.12 |
| 2008/0163484 | A1 * | 7/2008 | Coots | H05K 13/0452 29/832 |
| 2008/0172280 | A1 * | 7/2008 | Goulimis | G06Q 10/06 705/7.25 |
| 2008/0312992 | A1 * | 12/2008 | Hoshi | G06Q 10/0633 705/7.27 |
| 2009/0112343 | A1 * | 4/2009 | Yuan | G05B 19/41865 700/115 |
| 2010/0274367 | A1 * | 10/2010 | Kaufman | G05B 17/02 700/291 |
| 2011/0295647 | A1 * | 12/2011 | Ishibashi | G06Q 10/0633 705/7.27 |
| 2013/0290154 | A1 * | 10/2013 | Cherry | G06Q 10/1091 705/32 |
| 2014/0324517 | A1 * | 10/2014 | Harris | G06Q 10/0633 705/7.27 |
| 2015/0039115 | A1 * | 2/2015 | Sagara | G05B 19/41865 700/106 |
| 2015/0081263 | A1 * | 3/2015 | Nagahara | G06Q 50/04 703/7 |
| 2015/0178649 | A1 * | 6/2015 | Furman | G06Q 10/06312 705/7.22 |
| 2015/0278717 | A1 * | 10/2015 | Pasupathi | G06F 16/248 705/342 |
| 2016/0300840 | A1 * | 10/2016 | Seo | G06F 30/392 |
| 2016/0364674 | A1 * | 12/2016 | Macatangay | G06Q 10/04 |
| 2017/0075539 | A1 * | 3/2017 | Borromeo | G06F 3/0488 |
| 2017/0115651 | A1 * | 4/2017 | Wu | G05B 19/41865 |
| 2017/0115659 | A1 * | 4/2017 | Kothari | G06Q 10/06311 |
| 2018/0121850 | A1 * | 5/2018 | Zheng | G06Q 10/06313 |
| 2018/0129192 | A1 * | 5/2018 | Murakami | G06Q 50/04 |
| 2018/0150065 | A1 | 5/2018 | Yamazaki et al. | |
| 2018/0246765 | A1 * | 8/2018 | Chen | G06F 9/4881 |
| 2019/0056701 | A1 | 2/2019 | Ikeda | |
| 2019/0266514 | A1 * | 8/2019 | Akella | G05B 23/0254 |
| 2019/0366541 | A1 * | 12/2019 | Kobayashi | G06Q 50/04 |
| 2020/0159194 | A1 * | 5/2020 | Katsumata | G05B 19/4189 |
| 2020/0310398 | A1 * | 10/2020 | Ledung | G05B 17/02 |

FOREIGN PATENT DOCUMENTS

| | | |
|---|---|---|
| JP | 2015-065382 A | 4/2015 |
| JP | 2017-021764 A | 1/2017 |
| JP | 2018-092970 A | 6/2018 |
| WO | 2017/187511 A1 | 11/2017 |

OTHER PUBLICATIONS

International Search Report and Written Opinion of the International Searching Authority (Form PCT/ISA/210 and 237), mailed in connection with PCT/ JP2018/048485 and dated Mar. 26, 2019 (Total 6 pages).

* cited by examiner

FIG. 8A

| PRODUCT NUMBER | PROCESSING TIME | SETUP TIME | LINE |
|---|---|---|---|
| 1 | 200 | 50 | 1 |
| 2 | 150 | 10 | 2 |
| ⋮ | ⋮ | ⋮ | ⋮ |
| 6 | 300 | 20 | 2 |

| WORKER | LINE IN CHARGE |
|---|---|
| 1 | 1, 2 |

INFORMATION PROCESSING DEVICE AND SETUP OPERATION MODIFICATION METHOD

CROSS-REFERENCE TO RELATED APPLICATION

This application is a continuation application of International Application PCT/JP2018/048485 filed on Dec. 28, 2018 and designated the U.S., the entire contents of which are incorporated herein by reference.

FIELD

A certain aspect of embodiments described herein relates to an information processing device, a setup operation modification method, and a non-transitory computer-readable recording medium.

BACKGROUND

When a plurality of lines is used to process products, it is desirable to create a plan so that the processing, completion time is reduced as disclosed in Japanese Laid-Open Patent Publication No, 2006-287075. In the case of high-mix low-volume production, setting change referred to as setup is performed each time the type of the product to be manufactured is changed as disclosed in Japanese Laid-Open Patent Publication Nos. 2017-21764 and 2015-65382.

SUMMARY

It is desirable to reduce the processing completion time by devising the order of setup operations. However, when the setup operations are performed in the order of lines where the processing operation is completed, the time to completion of the processing may become long.

According to one aspect of embodiments, there is provided an information processing device including: a memory; and a processor coupled to the memory and configured to: rearrange setup operations with respect to an initial input order according to which products are to be input to a processing line including a plurality of lines to which a product that requires a setup operation and a processing operation is to be input, setup operations being not executed with the setup operations overlapped with each other in the plurality of lines, determine a processing completion time of the processing line based on the rearranged setup operations, and determine, as planning data, an order of setup operations that achieves a processing completion time less than a processing completion time of the initial input order among the processing completion time calculated.

The object and advantages of the invention will be realized and attained b means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8A illustrates product information stored in a product information storage unit, FIG. 8B illustrates an input order of products stored in an input order storage unit, and FIG. 8C illustrates worker information stored in a worker information storage unit.

FIG. 108 is a flowchart illustrating a process of the setup determination cell.

DESCRIPTION OF EMBODIMENTS

When high-mix low-volume production is performed using a surface mounting line or a processing equipment that performs various types of processing, the type of product changes many times in the course of a day. Thus, each time the type of product is changed, the setting of the surface mounting line or the setting of the processing equipment is changed. Such setting changes are referred to as "setup". An operation for setting change is referred to as a "setup operation". The time required for the setup operation is referred to as a "setup operation time". The "setup" is also referred to as "changeover".

While the setup operation is performed, processing by the surface mounting line or the processing equipment is stopped. The setup operation time diners depending on the product. Therefore, the processing completion time, which is the time required to complete the processing of all products, can be reduced by devising the execution order of the setup operations. However, when the execution order of setup operations at a certain point in time is devised, it will affect the progress of subsequent processing. Thus, to determine the optimal execution order of setup operations, it is desirable to solve a complex optimization problem taking into account the influence on later events.

Figure 1A:
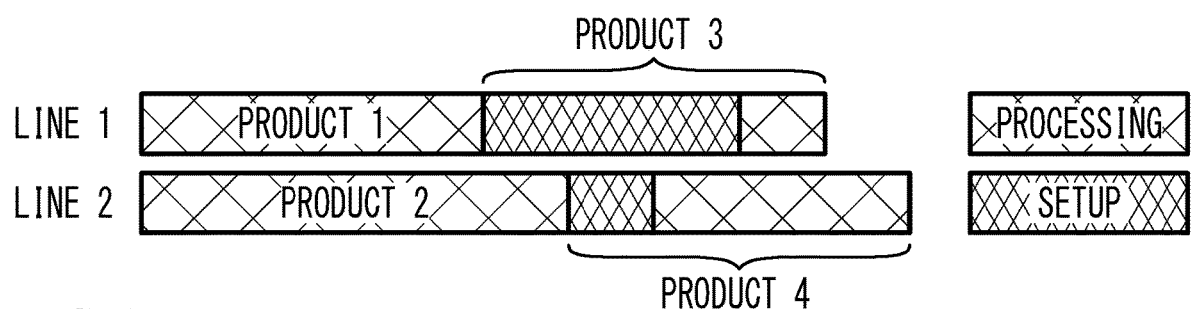
FIG. 1A to FIG. 1C are diagrams illustrating the processing completion time.

Here, a case where products with different processing operation times and different setup operation times flow through a line 1 and a line 2 of a processing line will be considered. For example, as illustrated in FIG. 1A, in the line. 1, processing of a product 1 is executed, a setup operation of a product 3 is executed when the processing operation of the product 1 is completed, and the processing operation of the product 3 is executed when the setup operation of the product 3 is completed. In the line 2, the processing operation of a product 2 is executed, a setup operation of a product 4 is executed when the processing operation of the product 2 is completed, and the processing operation of the product 4 is executed when the setup operation of the product. 4 is completed. For example, when there is a worker assigned to the line 2 in addition to a worker assigned to the line 1, the processing plan illustrated in FIG. 1A can be executed because the workers can be in charge of their own lines.

Figure 1B:
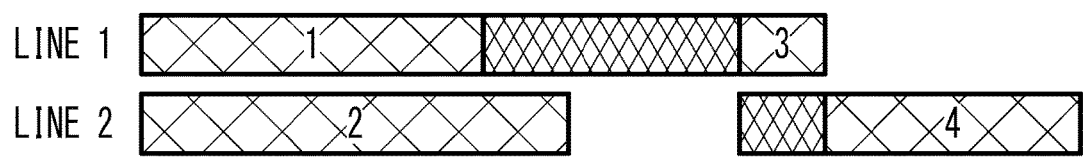

However, when one worker is in charge of both the line 1 and the line 2, the worker cannot perform the setup operations in the two lines at once. Therefore, when the times for the setup operations in the two lines overlap, the worker need to perform the setup operations in the two lines in sequence. Normally, as illustrated in FIG. 1B, the worker performs the setup operation that occurs first. However, the processing operation time differs depending on the product, which may result in a longer processing completion time.

Figure 1C:
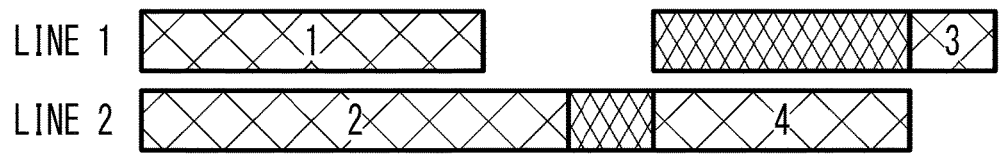

For example, as illustrated in FIG. 1C, although the setup operation of the product 4 occurs after the setup operation of the product 3, the processing completion time may be reduced by performing the setup operation of the product 4 before the setup operation for the product 3. However, since the worker is not presented with which line's setup operation is to be performed first, it is difficult for the worker to know which line's setup operation is to be performed.

Therefore, it may be considered to present the order of setup operations in real tune so that the processing completion time becomes shortest taking into consideration the deviation between the manufacturing plan and die actual result when the setup operations overlap. However, when the rearrangement of the input order of products is taken into consideration, more computation time is required. In addition, this method only focuses on improving the efficiency of the changeover operation, and the influence of the calculation results on other processes needs to be considered separately.

Thus, to take into consideration the propagation effect on other processes, it may be considered to create a work plan by planning a processing plan using a line simulator. However, this method is a system for planning an input plan, the optimization is not performed on the work plan, such as a proposal for avoiding the overlap of setup operations, that is not expressed in the input plan.

In embodiments described hereinafter, an information processing device, a setup operation modification method, and a setup operation modification program that can reduce the processing completion time will be described as an example.

First Embodiment

Figure 2A:
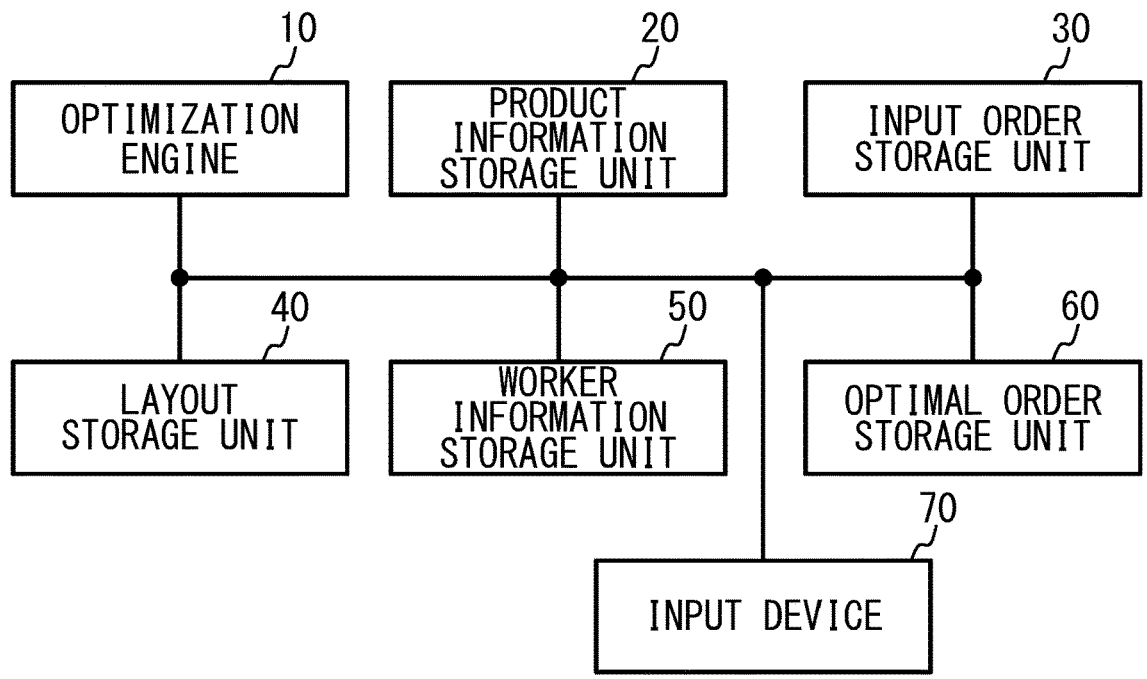
FIG. 2A and FIG. 2B are functional block diagrams illustrating an overall configuration of an information processing device in accordance with a first embodiment.
Figure 2B:
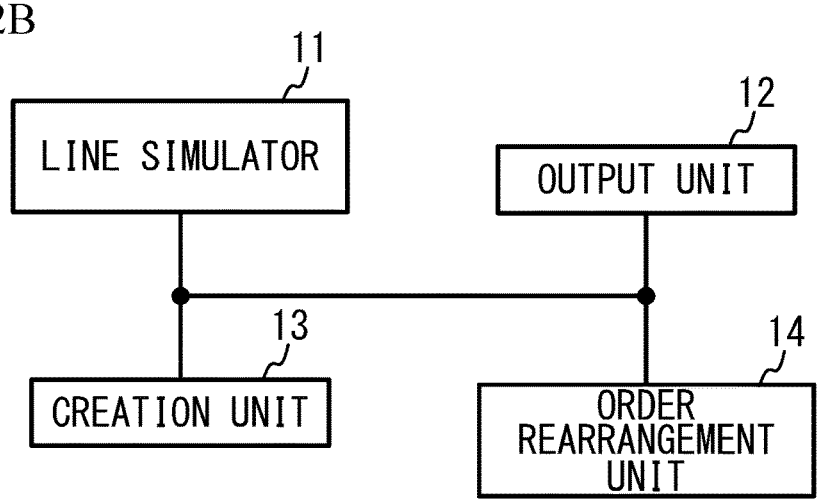

FIG. 2A and FIG. 2B are functional block diagrams illustrating an overall configuration of an information processing device 100 in accordance with a first embodiment.

As illustrated in FIG. 2A, the information processing device 100 includes an optimization engine 10, a product information storage unit 20, an input order storage unit 30, a layout storage unit 40, a worker information storage unit 50, an optimal order storage unit 60, and an input device 70. As illustrated in FIG. 2B, the optimization engine 10 includes a line simulator 11 an output unit 12, a creation unit 13, and an order rearrangement unit 14.

Figure 2C:
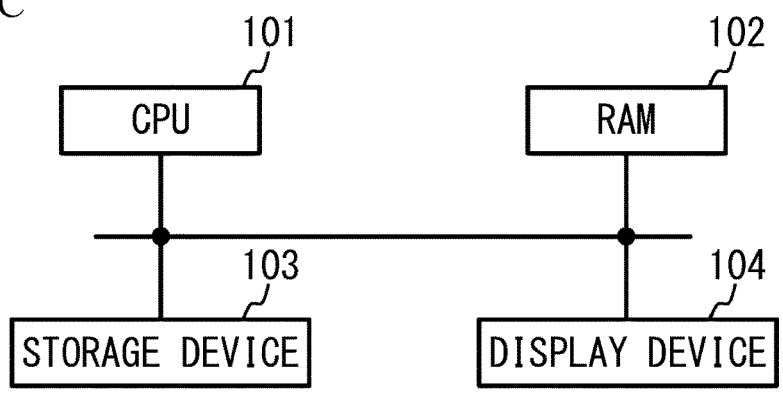
FIG. 2C is a block diagram illustrating a hardware configuration of the information processing device.

FIG. 2C is a block diagram illustrating a hardware configuration of the optimization engine 10, the product information storage unit 20, the input order storage unit 30, the layout storage unit 40, the worker information storage unit 50, and the optimal order storage unit 60. As illustrated in FIG. 2C, the information processing device 100 includes a CPU 101, a RAM 102, a storage device 103, and a display device 104.

The CPU (central processing unit) 101 is a central processing unit. The CPU 101 includes one or more cores. The RAM (random access memory) 102 is a volatile memory that temporarily stores a program executed by the CPU 10.1 and data processed by the CPU 101. The storage device 103 is a nonvolatile storage device. Used as the storage device 103 is, for example, a ROM (read only memory), a solid state drive (SSD) such as a flash memory, or a hard disk driven by a hard disk drive. The storage device 103 stores a setup operation modification program. The display device 104 is a liquid crystal display, an electro luminescence panel, or the like, and displays results of the setup operation modification process. In the present embodiment, the optimization engine 10, the product information storage unit 20, the input order storage unit 30, the layout storage unit 40, the worker information storage unit 50, and the optimal order storage unit 60 are implemented by the execution of the program, but hardware such as a dedicated circuit may be used.

Figure 3:
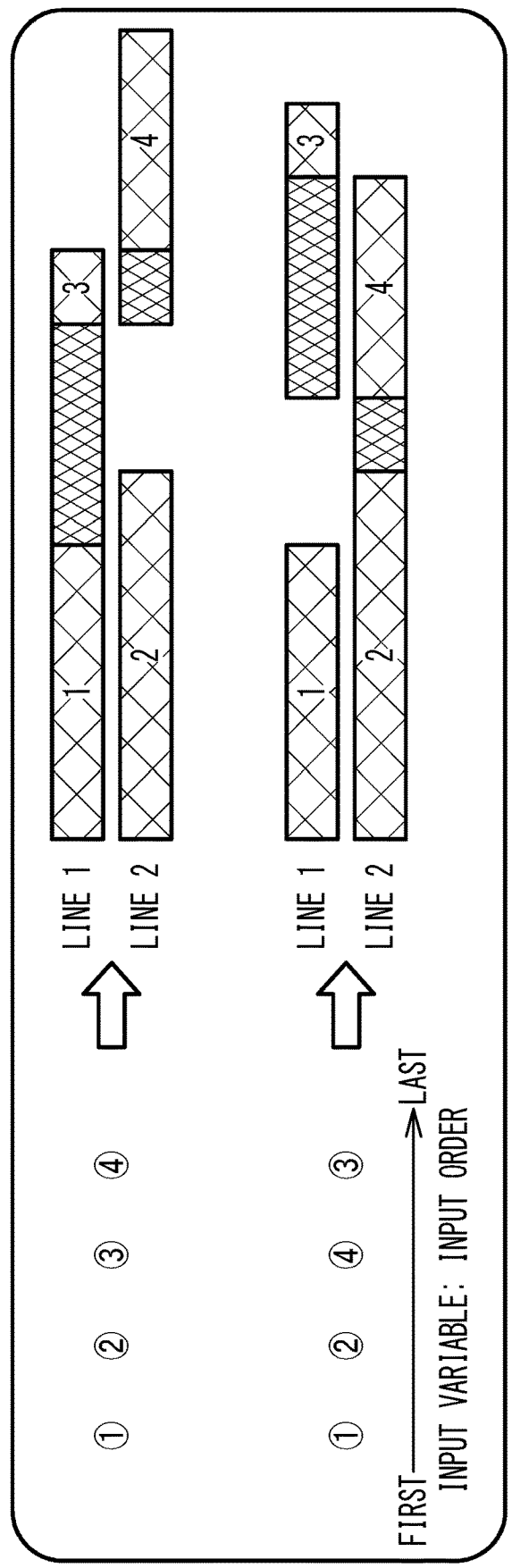
FIG. 3 is a conceptual drawing of a setup operation modification process in a line simulator.

FIG. 3 is a conceptual drawing of the setup operation modification process in the line simulator. In FIG. 3, the upper part illustrates the processing completion time, according, to the initial input order, and the lower part illustrates the processing completion time according to the input order after optimization. In the example of FIG. 1B, since the setup operation of the product 3 is performed before the setup operation of die product 4, the order of setup operations' is the product 1, the product 2, the product 3, and the product 4. By contrast, when optimized as illustrated in FIG. 1C, the setup operation of the product 4 is performed before the setup operation of the product 3, and therefore, the order of setup operations becomes the product 1, the product 2, the product 4, and the product 3. When the order of the setup operations is optimized, the order of setup operations is modified so that the processing completion time is shorter than the processing, completion time according to the initial input order.

First, a description will be given of a method of expressing the setup operation in the line simulator 11. For example, the basic operation of the line simulator 11 is based on Asymmetric Simple Exclusion Process (ASEP). ASEP is based on a simple idea that a product can proceed only when the front is empty. However, in a production site, products are moved according to the rule specific to the production site. Therefore, how the product is to be moved next is determined in an instruction block that defines how the product is moved in each position as a cell.

Figure 4A:
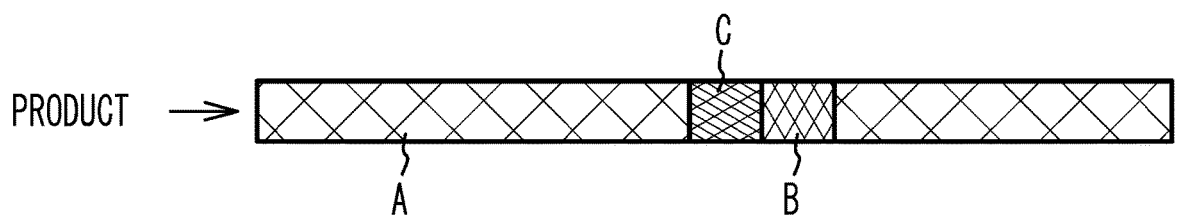
FIG. 4A illustrates a basic layout of the line simulator.

FIG. 4A is a diagram illustrating a basic layout of the line simulator 11. In a case where a product exists in a part named as a coni eye r cell A, the line simulator 11 moves the product to a destination cell when no product exists in the destination cell. This operation is a basic operation of ASEP. By contrast, when moving the product to a cell position named as a processing equipment cell B, the line simulator 11 starts the timer specific to the product, and makes the product stay in the processing equipment cell B until the timer specific to the product exceeds the product specific processing operation time. When the product-specific timer exceeds the processing operation time, the line simulator 11 considers that the processing is completed, and moves the product that has been made to stay from the processing equipment to the downstream process.

After finishing determining the movement of all products in the line, the line simulator 11 advances the timer of the line simulator 11, and repeats the operation. When all products to be input reach the end of the line, the timer is stopped, and the line simulator 11 outputs the value of the tinier as the processing completion time.

Figure 4B:
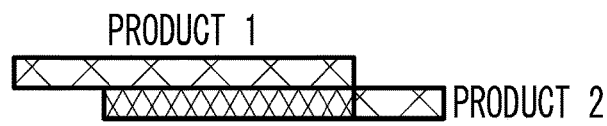
FIG. 4B illustrates a Gantt Chart when two products are input to one line.

In the present embodiment, to express the setup operation, a setup cell C is arranged as a dummy device immediately before the processing equipment cell B as illustrated in FIG. 4A. The basic operation of the setup cell C is the same as that of the processing equipment cell. B. That is, the line simulator 11 starts the timer specific to the product when moving the product to the setup cell C, and makes the product stay in the setup cell C until the timer specific to the product exceeds the product-specific setup operation time. Accordingly, the setup operation can be modeled. However, in this configuration, when the product proceeds to the processing equipment cell B, the setup cell C becomes empty, and it becomes possible to start the setup operation during the processing operation in the processing equipment cell B. In actual, the setup cell C is a dummy cell, and therefore, it is impossible to start the setup operation until the processing operation is completed. As a result, the operation time is unrealistically reduced. FIG. 4B illustrates a Gantt Chart when two products are input to ono line. It can be seen that when the product 1 proceeds to the processing equipment cell B, the product 2 can proceed to the setup cell C.

Figure 4C:
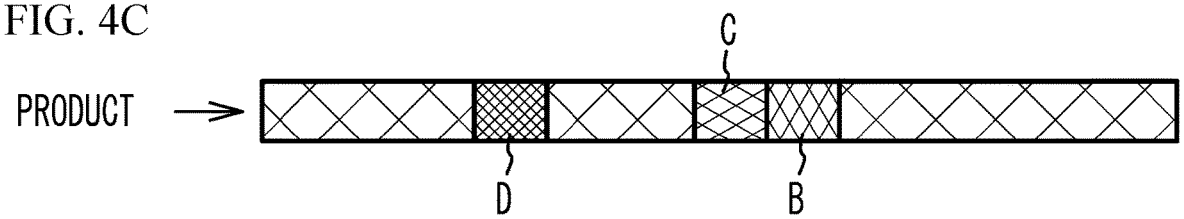
FIG. 4C illustrates a layout on the line simulator.
Figure 4D:
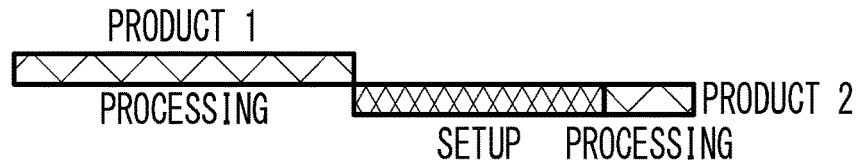
FIG. 4D illustrates a Gantt Chart when the same two products as the above are input using a setup determination cell.

Thus, in the present embodiment, a setup determination cell D is arranged ahead of the setup cell C. FIG. 4C is a diagram illustrating a layout on the line simulator. The setup determination cell D is a cell that executes an instruction that the product that has moved to the setup determination cell D is moved ahead only when there is no product in the part from the setup determination cell 11) to the processing equipment cell B. FIG. 4D illustrates a Gantt Chart when the same two products as the above are input using the setup determination cell D. As illustrated in FIG. 4D, since the product 2 cannot reach the setup cell C unless the processing of the product 1 is completed, a realistic processing completion time can be obtained.

Next, a description will be given of a method taking into consideration a case where one worker performs setup operations in a plurality of lines. The fact that when performing a setup operation in one of the lines, the worker cannot perform another setup operation simultaneously is reproduced on the line simulator. As the basic layout, a plurality of lines illustrated in FIG. 3C is prepared. Here, a route that circulates the worker is created separately from the product, and the worker is moved along the created route. This circuit route always includes both setup cells C, and when the worker and the product overlap in the setup cell C, the setup operation is performed. During the setup operation, the worker cannot move.

Figure 5A:
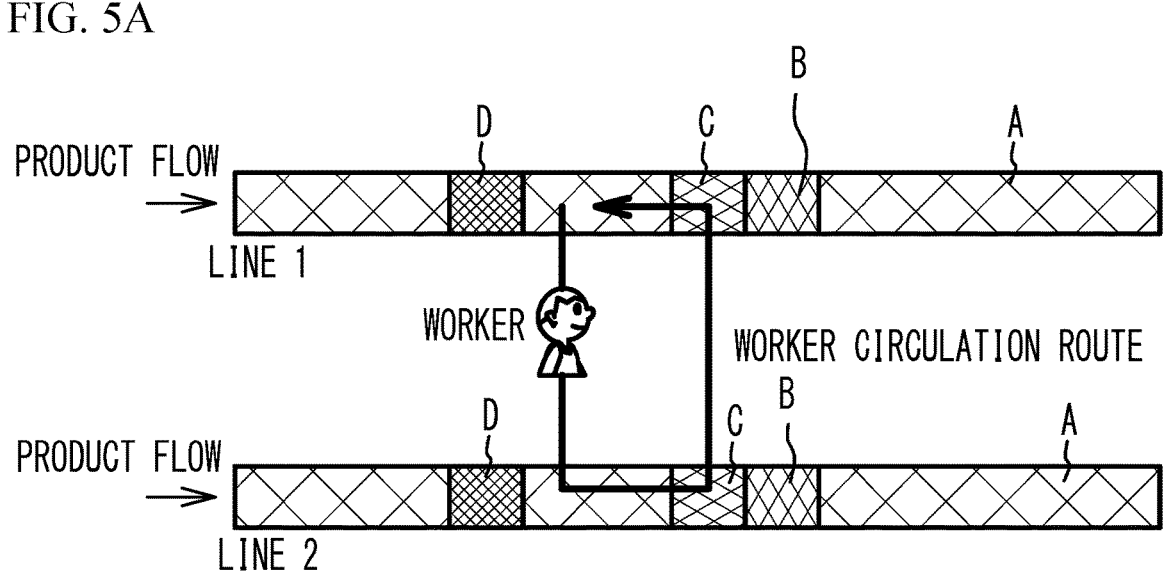
FIG. 5A illustrates a basic layout.
Figure 5B:
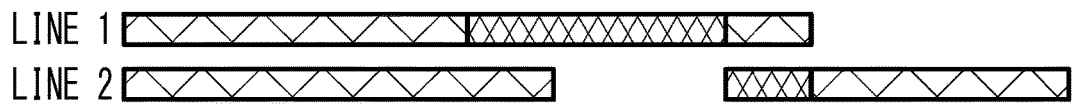
FIG. 5B illustrates a result when two products are input to each line illustrated in FIG. 5A.

FIG. 5A is a diagram illustrating this basic layout, FIG. 5B is a diagram illustrating the result when two products are input to each line illustrated in FIG. 5A. Since the worker cannot perform the setup operation in another line during the setup operation, the product waits in the setup cell C. When the setup operation in the line 1 in FIG. 5A is completed, the worker becomes able to move and start the setup operation of the product waiting in the line 2, and the overlap between the setup operations is avoided.

In the calculations so fax, the setup operations are performed in the order of products of which the processing is completed first. In the layout in FIG. 3C, the product that requires the setup operation waits until the setup is completed on the same line. Therefore, even when the input order is changed, this does not mean that the setup operation is changed. Thus, the input order needs to be changed to the order of the product 1, the product 2, the product 4, and the product 3 illustrated in FIG. 1C.

Figure 6:
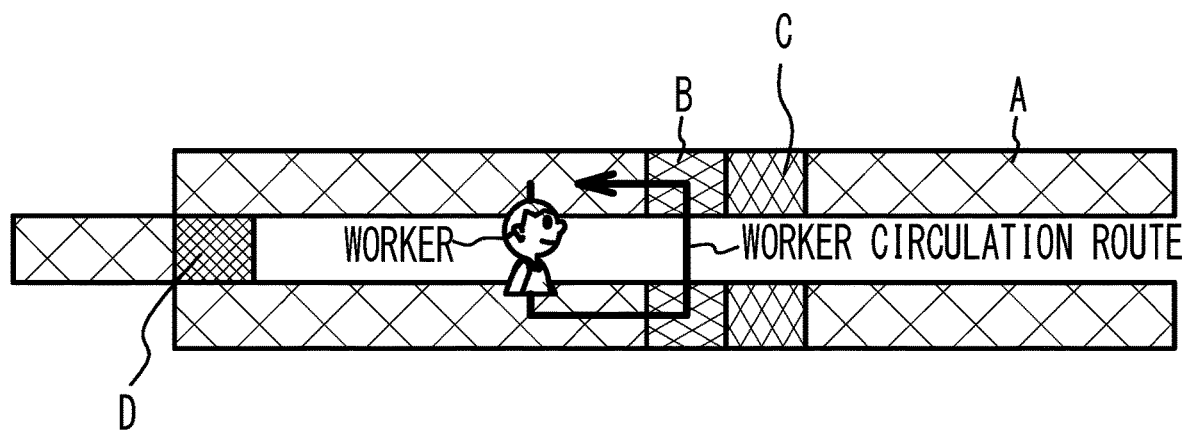
FIG. 6 illustrates a layout.

The present embodiment enables to change the order of setup operations by the input order by providing the setup determination cell D common to a plurality of lines at the entrance of the plurality of lines to which the worker is assigned. FIG. 6 is a diagram illustrating the layout. In the layout illustrated in FIG. 6, when the product 4 is input first, the line 1 is empty, but the line 2 is not empty. Therefore, the product 4 needs to wait in the setup determination cell D. As a result, a standby state is established in the line 1, and the product 4 can be moved to the setup cell C when the setup operation in the line 2 is completed.

Figure 7:
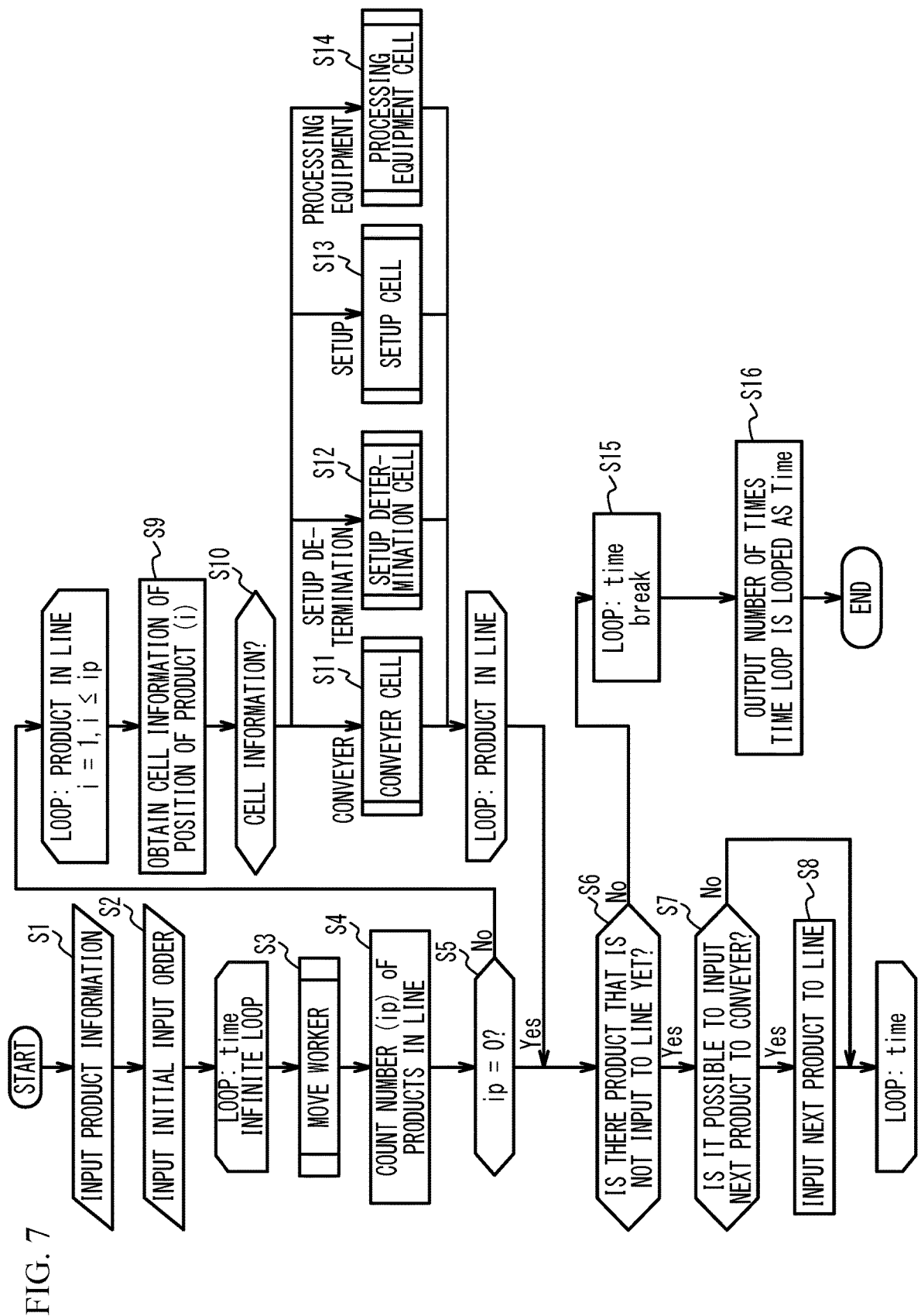
FIG. 7 illustrates a flowchart executed by a line simulator.

FIG. 7 illustrates a flowchart executed by the line simulator 11. As illustrated in FIG. 7, the line simulator 11 reads the product information from the product information storage unit 20 (step S1). FIG. 8A illustrates the product information stored in the product information storage unit 20. As illustrated in FIG. 8A, the processing operation time, the setup operation time, and the line are associated with each product. For example, the product 1 requires 200 unit times for the processing operation, 50 unit times for the setup operation, and is processed in the line 1.

Then, the line simulator 11 reads the initial input order from the input order storage unit 30 (step S2). FIG. 8B illustrates the initial input order stored in the input order storage unit 30. This initial input order is an initial value before optimization. In the example of FIG. 8B, the products are input in the order of the product 1, the product 2, the product 3, the product 4, a product 5, and a product 6.

Figure 9:
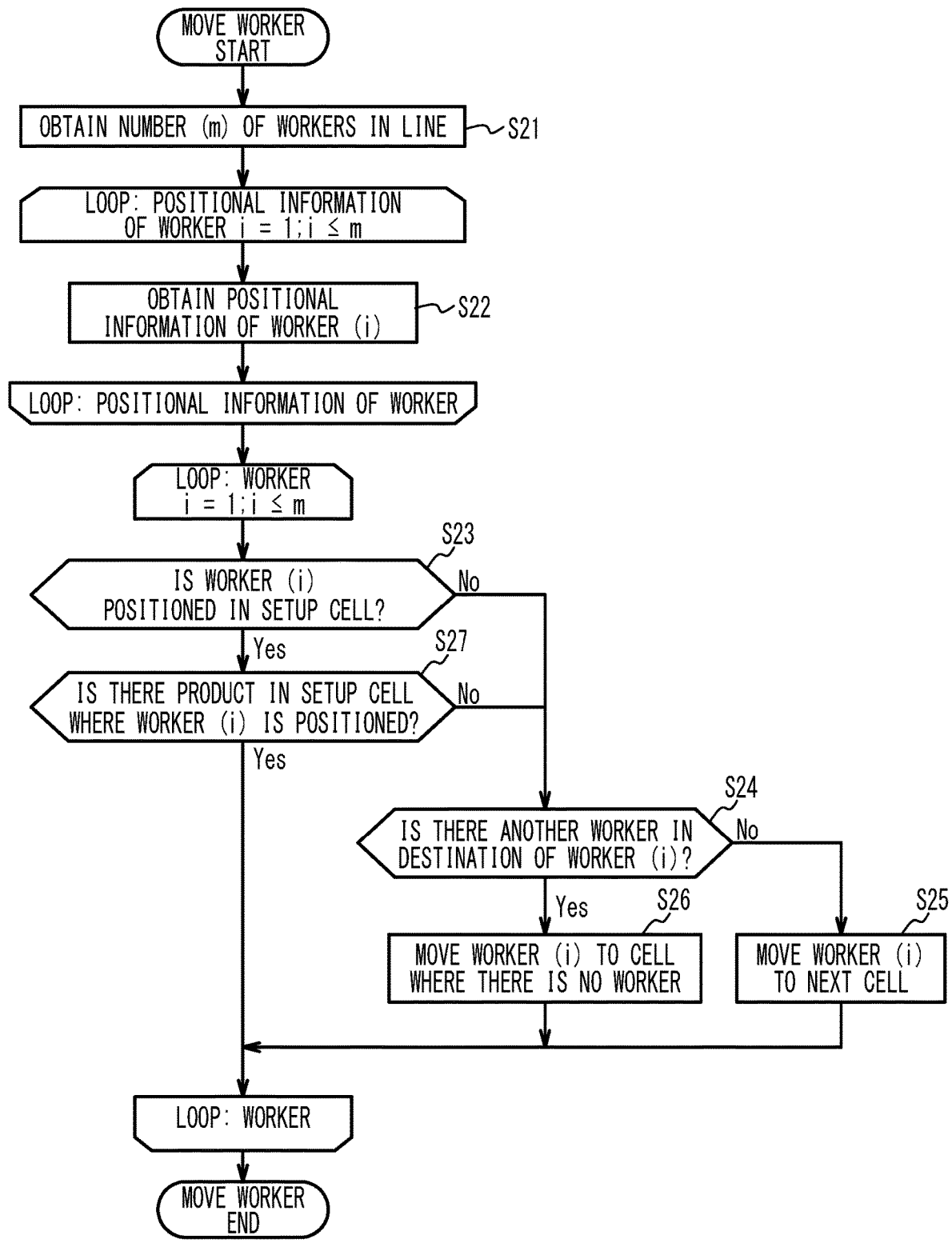
FIG. 9 is a flowchart illustrating a process of moving a worker.

Then, the line simulator 11 performs a process of moving a worker (step S3). FIG. 9 is a flowchart illustrating the process of moving a worker. As illustrated in FIG. 9, the line simulator 11 obtains the total number (m) of workers in all lines from the worker information storage unit 50 (step S21). FIG. 8C illustrates the worker information stored in the worker information storage unit 50. Then, the line simulator 11 obtains the positional information of a worker (i) (step S22). Note that i is an integer from 1 to 100. The process of step S22 loops until i goes from 1 to m.

When the loop is completed, the line simulator 11 determines whether the worker i is positioned in the setup cell C (step S23). When it is determined to be "No" in step S23, the line simulator 11 determines whether there is another worker in the destination of the worker i (step S24). When it is determined to be "No" in step S24, the line simulator 11 moves the worker i to the next cell in the worker circulation route (step S25). When it is determined to be "Yes" in step S24, the line simulator 11 moves the worker i to the cell where there is no worker in the worker circulation route (step S26).

When it is determined to be "Yes" in step S23, the line simulator 11 determines whether there is a product in the setup cell C where the worker i is positioned (step S27). When it is determined to be "No" in step S27, step S24 is executed. When it is determined to be "Yes" in step S27, after step S25 is executed, or after step S26 is executed, the process returns to step S23 until i becomes m from 1. When it is determined to be "Yes" in step S27, after step S25 is executed, or after step S26 is executed, when i becomes in, the flowchart ends. Execution of the process of moving a worker allows the worker to be moved to the setup cell C where there is no worker and there is a product. In addition, the worker is made to stay in the setup cell C until the product is moved from the setup cell C where the worker is positioned.

Reference back to FIG. 7, the line simulator 11 then counts the total number (ip) of products in all lines (step S4). Then, the line simulator 11 determines whether ip=0 (step S5). When no products are input to any of the lines yet, it is determined to be "Yes" in step S5. When a product is already input and the product is left in any of the lines, it is determined to be "No" in step S5.

When it is determined to be "Yes" in step S5, the line simulator determines whether there is a product that is not input to the processing line yet or there is a product left in the line (step S6). Specifically, it is determined whether there is a product that is not input to the processing line yet among products included in the product input order read in step S2, and whether there is a product left in the line. When at least one of them is applicable, it is determined to be "Yes". When it is determined to be "Yes" in step S6, the line simulator 11 determines whether it is possible to input the next product to the processing line (step S7). Specifically, when there is no product in the first conveyer cell A of the line associated with the next product to be input, it is determined that it is possible to input the product. When it is determined to be "Yes" in step S7, the line simulator 11 inputs the next product to the line associated with the next product (step S8). When it is determined to be "No" in step S7 or after step S8 is executed, the process is executed again from step S3. B repeating the processes from step S3 to step S8, the product is input to the line according to the initial input order obtained in the step S2.

When it is determined to be "No" in step S5, the line simulator 11 obtains information about the cell where the product (i) is located (step S9). Note that i has a value of 1 to ip. When the total number of products on the line is two, ip is 2, and i has a value of 1 and 2. Then, the line simulator 11 determines whether the cell obtained in step S9 is the conveyer cell A, the setup determination cell D, the setup cell C. or the processing equipment cell B (step S10).

When it is determined that the cell obtained in step S9 is the conveyer cell. A in step S10, the line simulator 11 executes a process oldie conveyer cell (step S11). When it is determined that the cell obtained in step S9 is the setup determination cell D in step S10, the line simulator 11 executes a process of the setup determination cell (step S12). When it is determined that the cell obtained in step S9 is the setup cell C in step S10, the line simulator 11 executes a process of the setup cell (step S13). When it is determined that the cell obtained in step S9 is the processing equipment cell B in step S10, the line simulator 11 executes a process of the processing equipment cell (step S14).

Figure 10A:
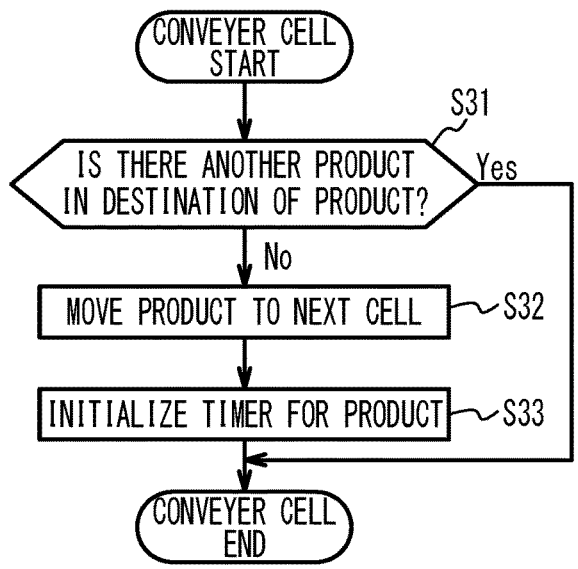
FIG. 10A is a flowchart illustrating a process of a conveyer cell.

FIG. 10A is a flowchart illustrating the process of the conveyer cell. As illustrated in FIG. 10A, the line simulator 11 determines whether there is another product in the cell to which the product is to be moved (step S31). When it is determined to be "No" in step S31, the product is moved to the next cell (step S32). Then, the line simulator 11 initial- izes the timer for the product (step S33). After step S33 is executed or when it is determined to be "Yes" in step S31, the execution of the flowchart is completed. Execution of the process of the conveyer cell allows the product to be moved to the destination cell when there is no product in the destination cell, and enables to make the product wait when there is another product in the destination cell.

Figure 10B:
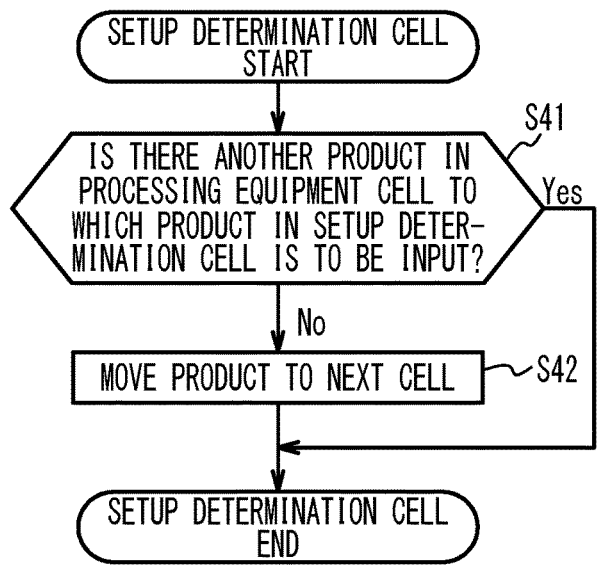
FIG. 10C is a flowchart of a process of a processing equipment cell.

FIG. 10B is a flowchart illustrating the process of the setup determination cell. As illustrated in FIG. 10B, the line simulator 11 determines whether there is another product in the processing equipment cell B to which the product in the setup determination cell is to be input (step S41). When it is determined to be "No" in step S41, the line simulator moves the product to the next cell (step S42). After step S42 is executed or when it is determined to be "Yes" in step S41, the execution of the flowchart is completed. Execution of the process of the setup determination cell allows the product to be moved to the processing equipment cell B to which the product in the setup determination cell D is to be input when there is no product in the processing equipment cell 1, and enables to make the product wait when there is another product in the processing equipment cell B.

Figure 11:
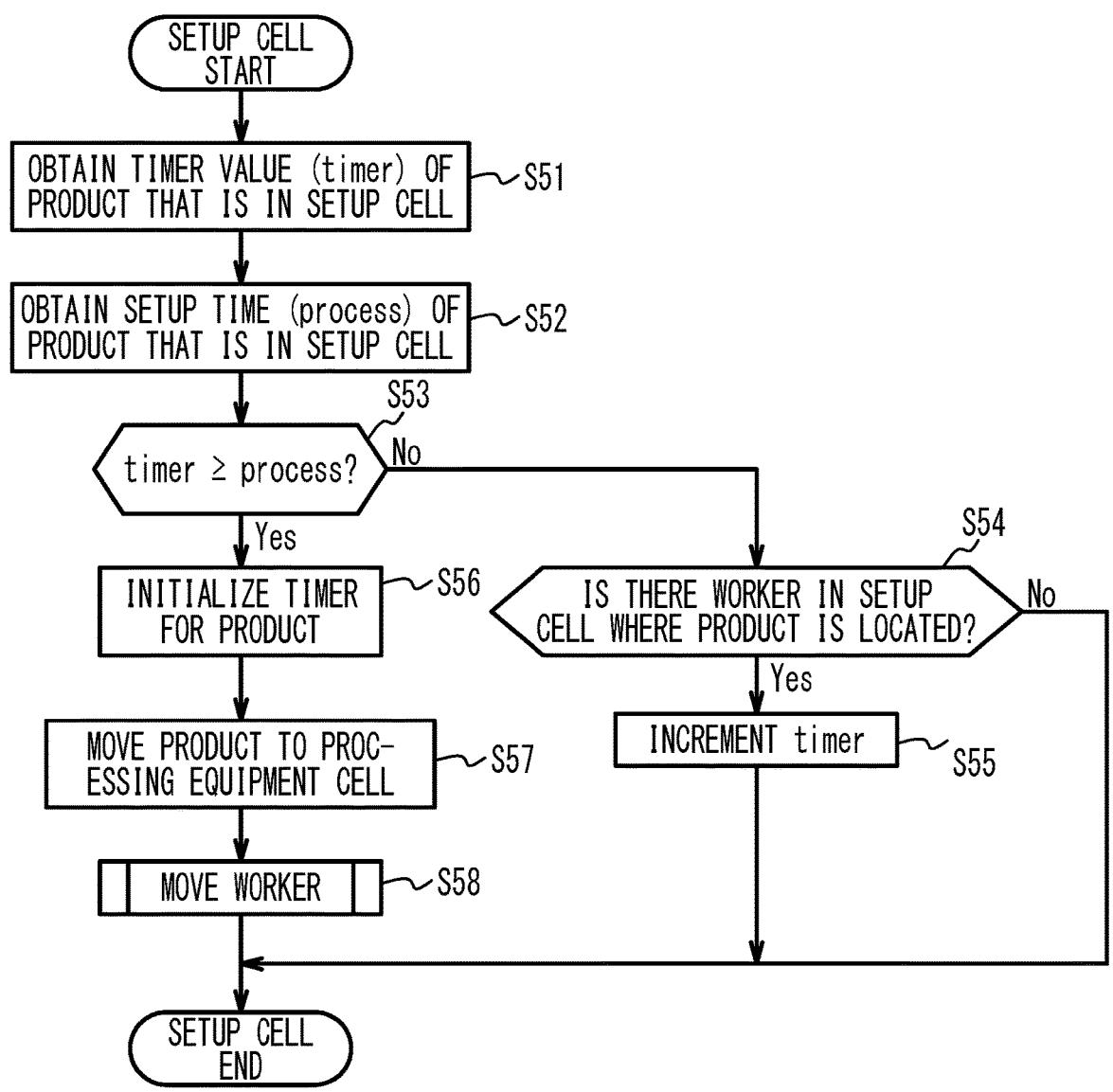
FIG. 11 is a flowchart illustrating process of a setup cell.

FIG. 11 is a flowchart illustrating the process of the setup cell. As illustrated in FIG. 11, the timer value (timer) for the product in the setup cell C is obtained (step S51). Then, the line simulator 11 obtains the setup time (process) of the product that is in the setup cell C (step S52). Then, the line simulator 11 determines whether timer is equal to or greater than process (step S53).

When it is determined to be "No" in step S53, the line simulator 11 determines whether there is a worker in the setup cell C where the product is located (step S54). When it is determined to be "Yes" in step S54, the line simulator 11 increments timer (step S55). When it is determined to be "Yes" in step S53, the line simulator 11 initializes the timer for the product (step S56). Then, the line simulator 11 moves the product to the processing equipment cell B (step S57). Then, the line simulator 11 executes the process of moving a worker (step S58).

After step S55 is executed, after step S5 is executed, or when it is determined to be "No" in step SM, the flowchart ends. Execution of the process of the setup cell enables to make the product wait when there is no worker in the setup cell C when the product has been moved to the setup cell C. In addition, when there is a worker in the setup cell C when the product is moved to the setup cell C, the setup operation time can be counted.

Figure 10C:
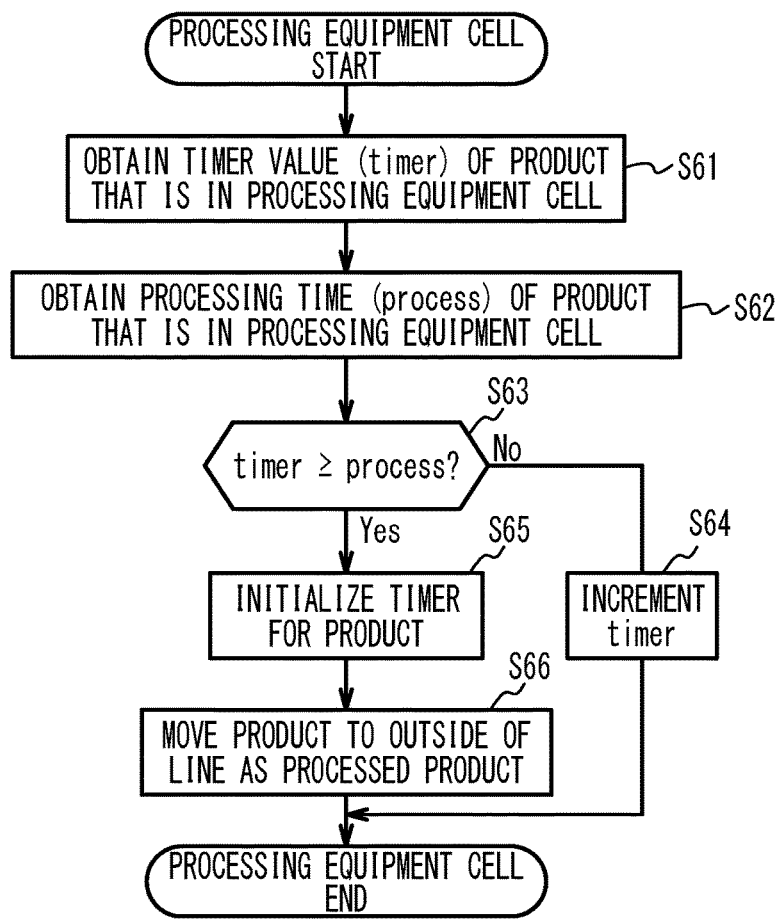

FIG. 10C is a flowchart illustrating the process of the processing equipment cell. As illustrated in FIG. 10C, the line simulator 11 obtains the tinier value (timer) for the product that is in the processing equipment cell 13 (step S61). Then, the line simulator 11 obtains the processing operation time (process) of the product that is in the pro- cessing equipment cell B (step S62). Then, the line simulator 11 determines whether inner is equal to or greater than process (step S63). When it is determined to be "No" in step S63, the line simulator 11 increments timer (step S64). When it is determined to be "Yes" in step S63, the line simulator 11 initializes the timer for the product (step S65). Then, the line simulator 11 moves the product to the outside of the line as the processed product (step S66). After step S64 or step S66 is executed, the flowchart ends. By executing the process of the processing equipment cell B, the processing operation time can be counted.

The loop from step S9 to S14 (product-in-line loop) is repeated until the product number i becomes ip from 1. This allows one of the processes of step S11 to step S14 to proceed for all products in the processing line.

Thereafter, step S6 is executed. Every time the loop from step S5 to step S14 (time loop) is executed once, one unit time is advanced. Thus, b obtaining the number of times the time loop is looped, the completion time of the line that takes the largest time (the processing completion time) is obtained.

When it is determined to be "No" in step S6, the line simulator 11 breaks (stops) the time loop (step S15). Then, the line simulator 11 calculates the number of times the time loop is looped and outputs it as Time (step S16). Thereafter, the flowchart in FIG. 7 is completed. This Time corresponds to the processing completion time.

Figure 12:
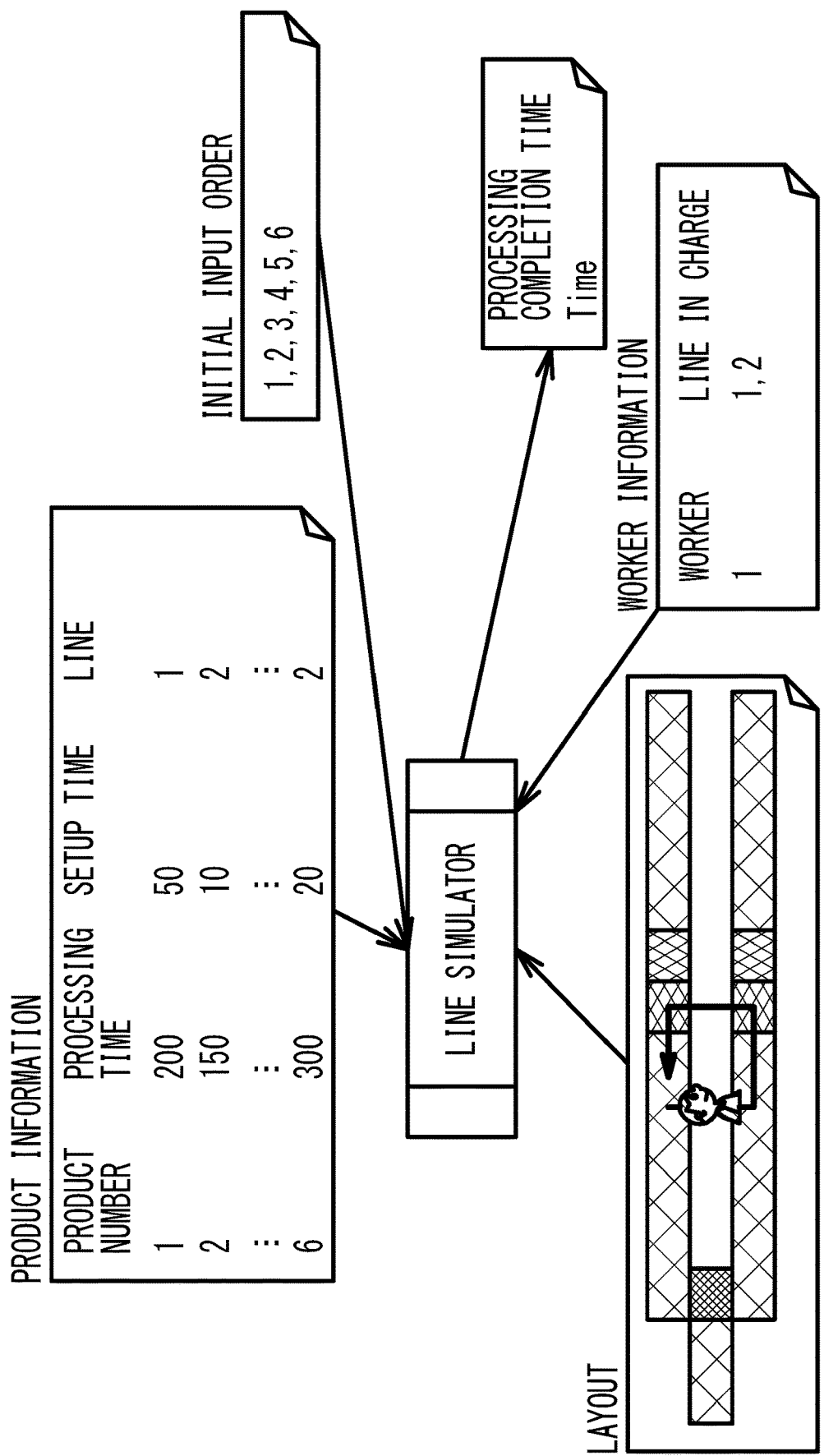
FIG. 12 is a diagram illustrating a concept of data input/output.

FIG. 12 illustrates a concept of data input/output so far. As illustrated in FIG. 12, the product information is read from the product information storage unit 20. The information read at this time is the processing operation time, the setup operation time, and the line. The initial input order is read from the input order storage unit 30. The layout is read from the layout storage unit 40. The worker information is read from the worker information storage unit 50. The line simulator 11 calculates the processing completion time Time using these data.

Figure 13:
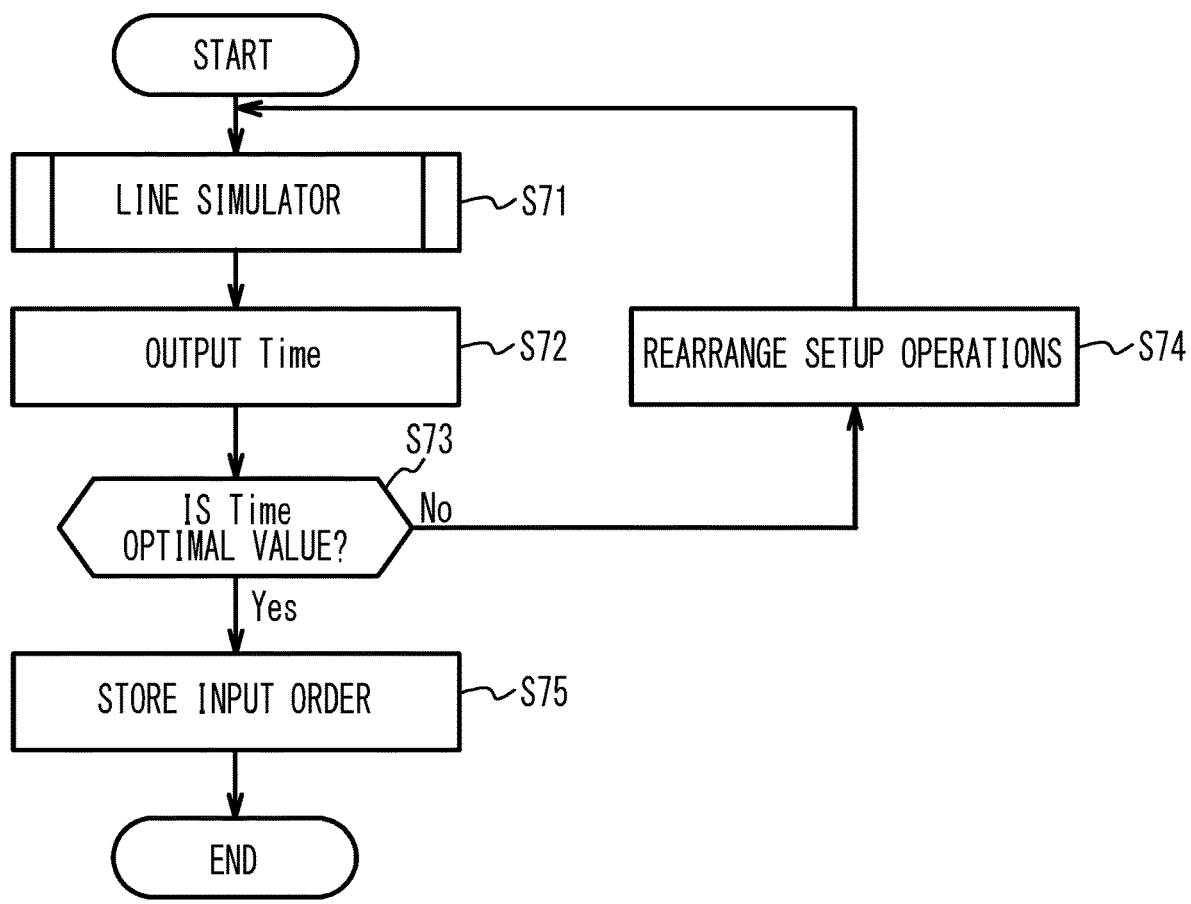
FIG. 13 is a flowchart illustrating a setup operation modification process executed by an optimization engine.

The optimization engine 10 rearranges the order of setup operations with respect to the initial input order, and calculates the processing completion time after the rearrangement, and creates, as planning data, the order of setup operations that achieves the processing completion time shorter than the processing completion time of the initial input order among the calculated processing completion times. For example, by executing the flowchart in FIG. 7 with respect to each pattern after the rearrangement, the pattern that achieves the smallest processing completion time Time is obtained as the optimal value, and the order of setup operations of this pattern is created as planning, data. FIG. 13 is a flowchart illustrating a setup operation modification process executed by the optimization engine 10 in this case.

As illustrated in FIG. 13, the line simulator 11 executes the process of FIG. 7 using the product information stored in the product information storage unit 20, the initial input order stored in the input order storage unit 30, the layout stored in the layout storage unit 40, and the worker information stored in the worker information storage unit 50, to obtain the processing completion time Time (step S71).

Then, the output unit 12 outputs the processing completion time Time obtained by the line simulator 11 (step S72). Then, the creation unit 13 determines whether the processing completion time Time output by the output unit 12 is an optimal value (step S73). For example, the ere at ion unit 13 may determine that the processing completion time Time is the optimal value when the processing completion time Time is less than the processing completion time of the initial input order. Alternatively, the creation unit 13 may determine that the processing completion time Time is the optimal value when the processing completion time Time is equal to or less than a threshold value that is loss than the processing completion time of the initial input order.

When it is determined to be "No" in step S73 the order rearrangement unit 14 rearranges the setup operations with respect to the initial input order, and inputs it to the line simulator 11 (step S74). When step S74 is executed for the second time or later, one of the rearrangement candidates that are not input to the line simulator 11 yet among rearrangement candidates is input to the line simulator 11. Thereafter, the process is executed again from step S71.

When step S71 is executed after step S74 is executed, the line simulator 11 uses the input order input from the order rearrangement unit 14. When it is determined to be "Yes" in step S73, the creation unit 13 stores the input order subjected to determination in the optimal order storage unit 60 (step S75). The input order in this case corresponds to the planning data indicating the order of setup operations that achieves the processing completion time that is less than the processing completion time of the initial input order.

Figure 14A:
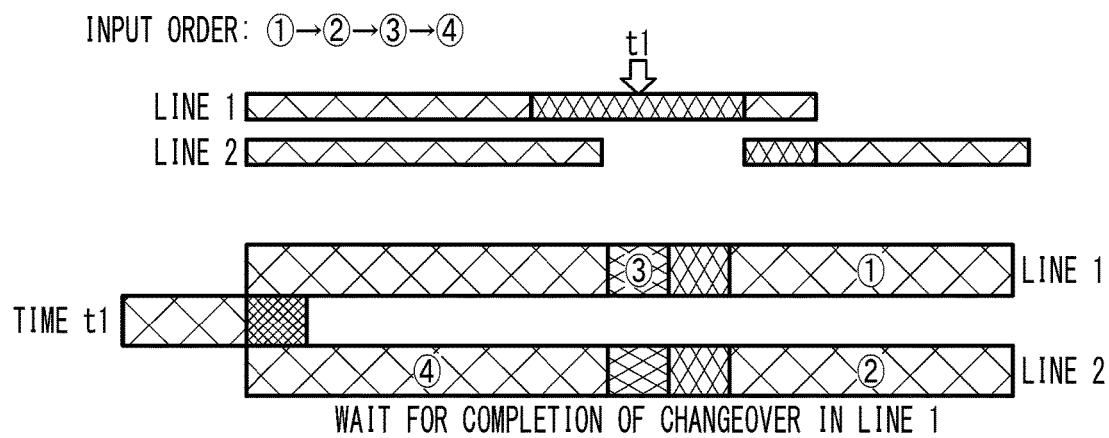
FIG. 14A schematically illustrates a Gantt Chart of each production line before the input order is changed, and the positions of the products at time t1, and FIG. 14B schematically illustrates a Gantt. Chart of each production line after the input order is changed, and the positions of the productions at time t1.
Figure 14B:
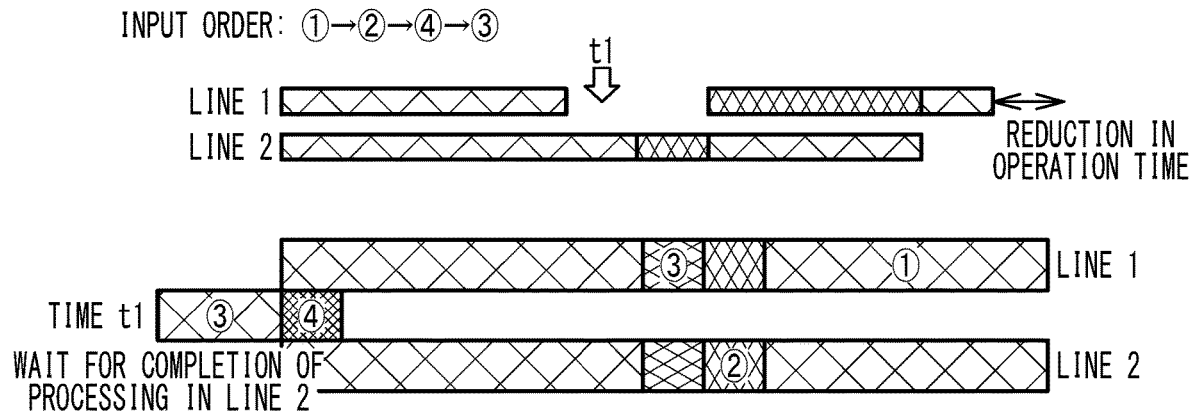

By executing the setup operation modification process, the optimal processing completion time Time can be calculated. The processing completion time Time may be obtained with respect to each of all rearranged input orders, and the smallest value may be determined as the optimal processing completion time Time, FIG. 14A schematically illustrates a Gantt Chart of each line before the input order is changed and the positions of the products at time t1. FIG. 14B schematically illustrates a Gantt Chart of each line after the input order is changed and the positions of the products at time t1. As illustrated in FIG. 14B, by rearranging the input order, it becomes possible to generate a waiting time for the setup operation inside the line simulator.

Figure 15:
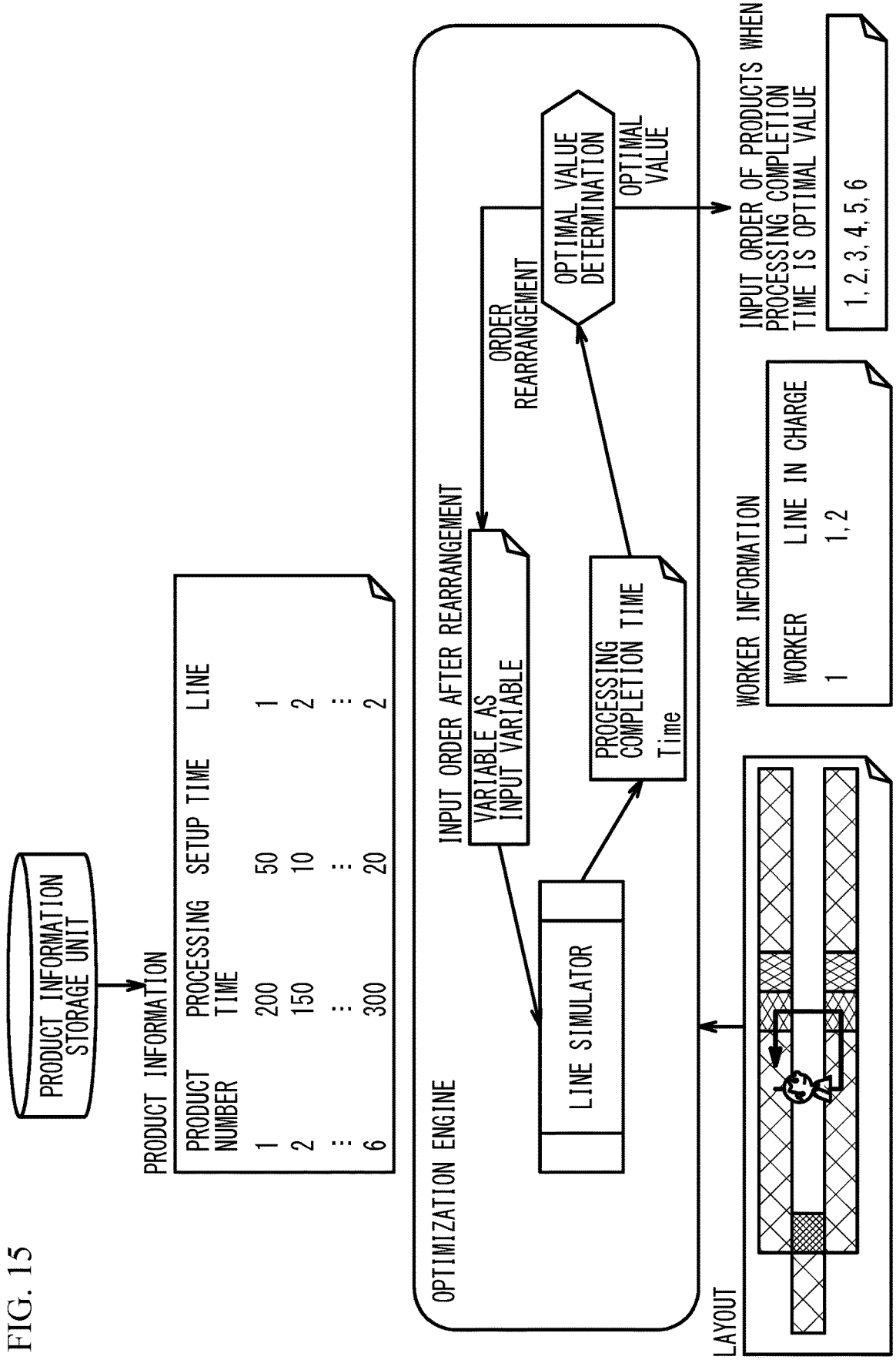
FIG. 15 is a conceptual drawing of the first embodiment.

The input order input to the line simulator 11 directly corresponds to the order of setup operations of the worker. Therefore, by optimizing the processing completion time obtained from the line simulator 11 by rearranging the input order of products, the order of setup operations that achieves a shorter processing completion time can be obtained, FIG. 15 illustrates a conceptual drawing in accordance with the present embodiment. The line simulator 11 illustrated in FIG. 15 is iteratively calculated h the optimization engine. The input variable for this is the input order of the products to be determined. The objective function of the optimization is the processing completion time Time output from the line simulator 11, and the input order that minimizes the objective function is determined. The input order having a shorter processing completion time. Time, which is output as the result, is identical to the order of setup operations, and thus, the user can obtain the optimal order of setup operations as a result.

In the present embodiment, the setup operations are rearranged with respect to the initial input order according to which products are to be input to the processing line including a plurality of lines to which a product that requires a setup operation and a processing operation is to be input, setup operations being not executed with the setup operations overlapped with each other in the plurality of lines. Then, the processing completion time of the processing line after rearrangement is calculated. Among the calculated processing completion times, the order of setup operations that achieves the processing completion time less than the processing completion time of the initial input order is created as planning data. Use of this planning data reduces the processing completion time.

The display device 104 may display the planning data created by the creation unit 13. The input device. 70 may input products to the processing line according to the planning data created by the creation unit 13.

(Variation)

A case where a large number of products are to be input will be considered. When a lame number of products are to be input, it becomes difficult to solve a combinational problem. Thus, the optimal order of setup operations is obtained by rearranging the input order only in the part where the setup operations of the worker overlap and the part where the setup operations are adjacent to each other.

The key point in this process is to set in advance, as the input order, the part where the setup operations of the worker overlap and the part where the setup operations are close to each other. Therefore, in the present variation, the input order of the products for which the order of setup operations is to be determined is determined in advance using a setup overlap avoiding layout illustrated in FIG. 5A. In this model, since a product that can be set up first is processed first, the order of processing-completed products can be used as an initial model for avoiding overlaps. From the initial order determined in the above described manner, only the products for the lines in charge are cut and optimized using the method illustrated in FIG. 6. The first product among the products determined in the above is registered as the product that is to be processed first. Thereafter, under the assumption that this first product exists as the input-order-to-be-determined product, the optimization is repeated for the same number of times as the number of products.

Figure 16:
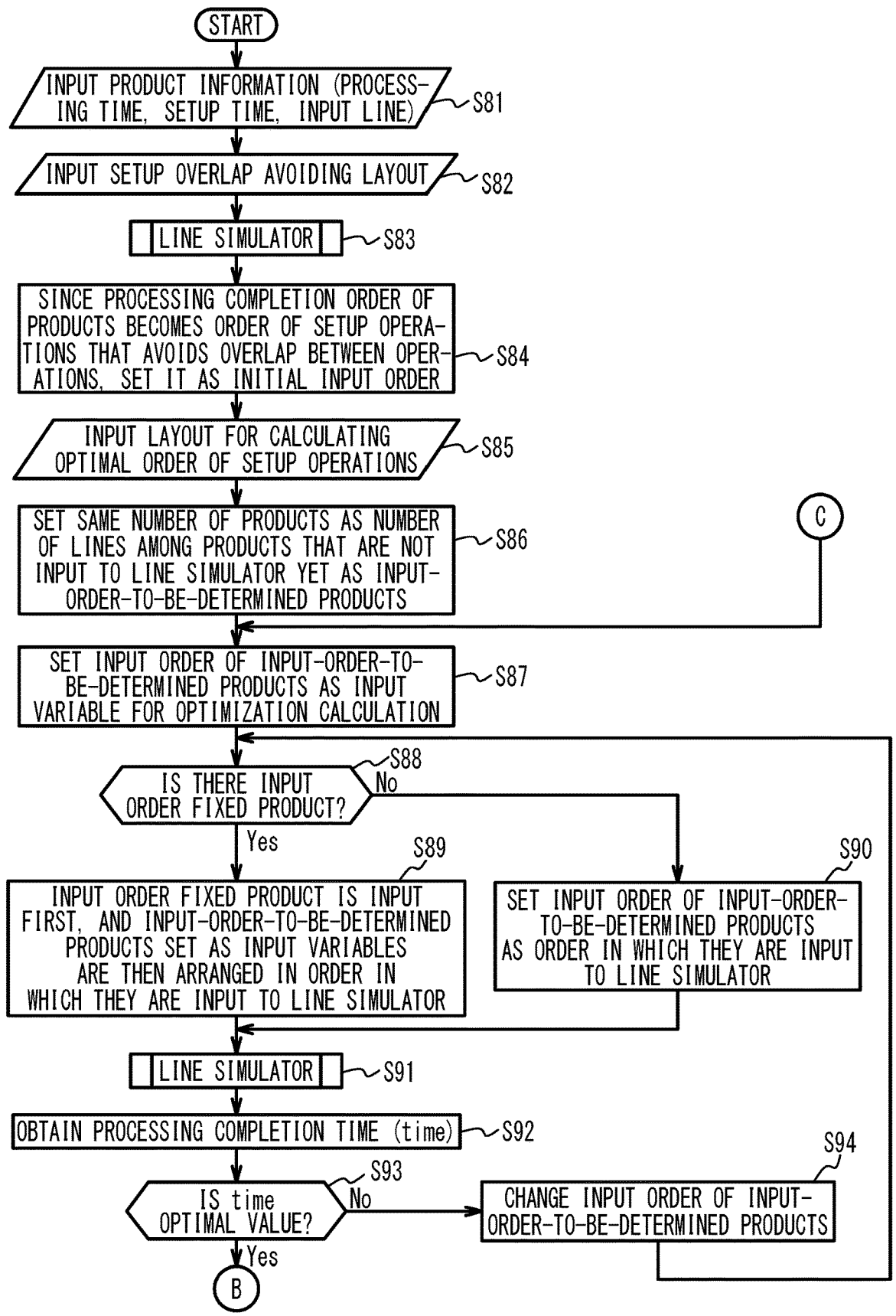
FIG. 16 illustrates a flowchart executed by the optimization engine in a variation.
Figure 17:
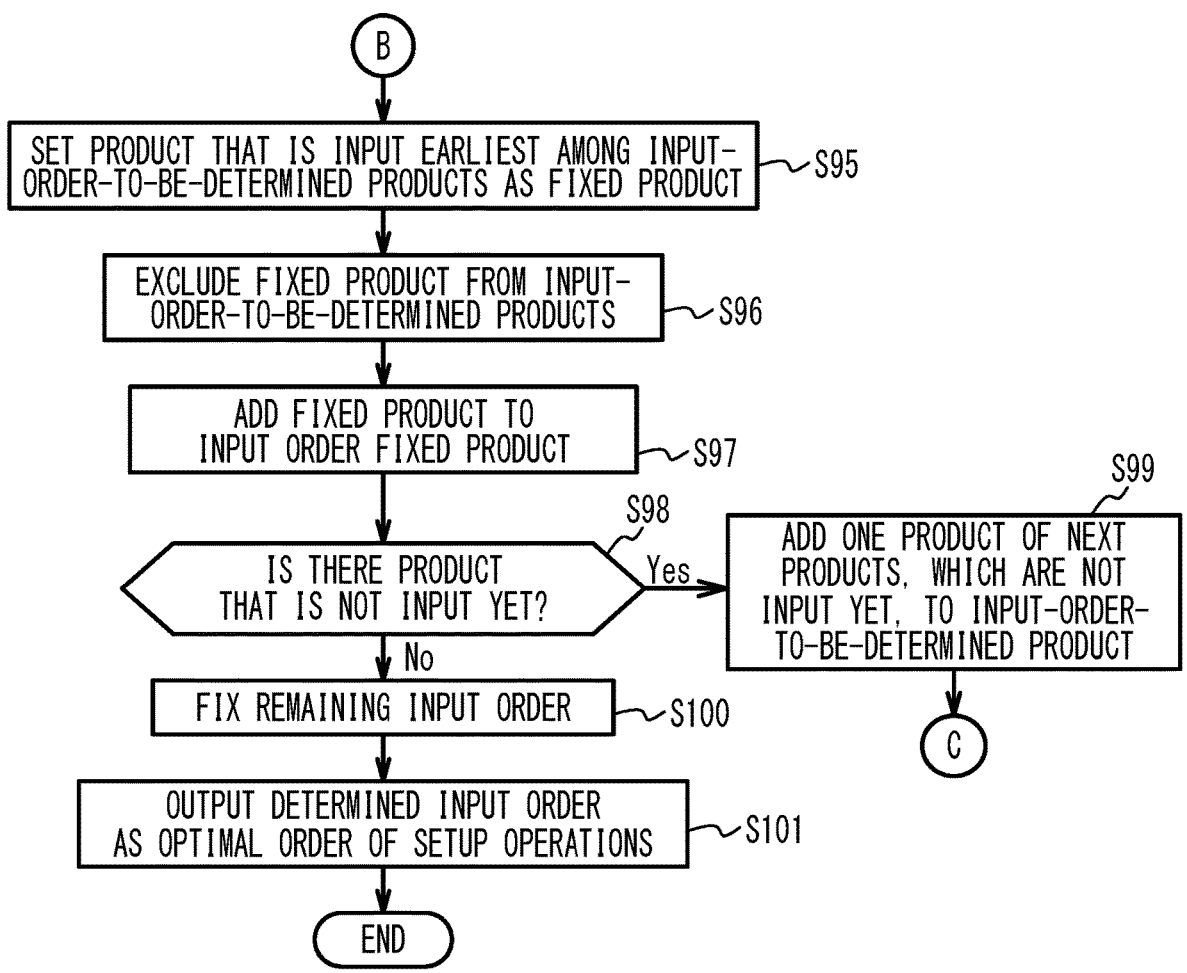
FIG. 17 illustrates a flowchart executed by the optimization engine in the variation.

FIG. 16 and FIG. 17 illustrate flowcharts executed by the optimization engine 10 in the present variation. As illustrated in FIG. 16 and FIG. 17, the line simulator 11 reads the product information from the product information storage unit 20 (step S81). Then, the line simulator 11 reads the setup overlap avoiding layout in FIG. 5A from the layout storage unit 40 (step S82). Then, the line simulator 11 determines the processing completion order of products, using the product information read in step S81 and the setup overlap avoiding layout read in step S82 (step S83).

Since the overlap avoiding layout is used, the order that reduces the processing completion time is not obtained, but the order of setup operations according to which the processing completion order of the products avoids the overlap between operations is obtained. The line simulator 11 sets this processing completion order of the products as the initial input order (step S84). Then, the line simulator 11 reads the layout for calculating the optimal order of setup operations illustrated in FIG. 6 from the layout storage unit 40 (step S85). Then, the line simulator 11 sets the same number of products as the number of lines as the input-order-to-be-determined products among the products that are not yet input to the line simulator 11 (step S86).

Then, the order rearrangement unit 14 sets the input order of the input-order-to-be-determined products as the input variable of the optimization calculation (step S87). Then, the order rearrangement unit 14 determines whether there is an input order fixed product (step S88). When it is determined to be, "Yes" in step S88, the order rearrangement unit 14 inputs the input order fixed product first, and then arranges the input-order-to-be-determined products set as the input variables in the order in which the input-order-to-be-determined products are to be input to the line simulator 11 (step S89). When it is determined to be "No" in step S88, the order rearrangement unit 14 sets the input order of the input-order-to-be-determined product as the order of the products to be input to the line simulator 11 (step S90).

After step S88 is executed, or after step S89 is executed, the line simulator 11 obtains the processing completion time Time by executing the flowchart in FIG. 7 using the input order set in step S89 or step S90 (step S91). The output unit 12 outputs the processing completion time Time (step S92). The creation unit 13 determines whether the processing completion time Time is an optimal value (step S93). The determination may be executed as in the same manner as the determination in step S73 in FIG. 13. When it is determined to be "No" in step S93, the order rearrangement unit 14 rearranges the input order of the input-order-to-be-determined products (step S94). Thereafter, the process is executed again from step S88.

When it is determined to be "Yes" in step S91, the creation unit 13 sets the product that is to be input earliest among the input-order-to-be-determined products as a fixed product (step S95). Then, the creation unit 13 excludes the fixed product from the input-order-to-be-determined products (step S96). Then, the creation unit 13 adds the fixed product to the input order fixed product (step S97).

Then, the creation unit 13 determines whether there is still a product that is not input yet (step S98). When it is determined to be "Yes" in step S98, the creation unit 13 adds one product of the products that are not input yet to the input-order-to-be-determined product (step S99). Thereafter, the process is executed again from step S87. When it is determined to be "No" in step S98, the creation unit 13 fixed the remaining input order (step S100). Then, the creation unit 13 outputs the determined input order as the optimal order of setup operations (step S101). Thereafter, the execution of the flowchart is completed.

Figure 18:
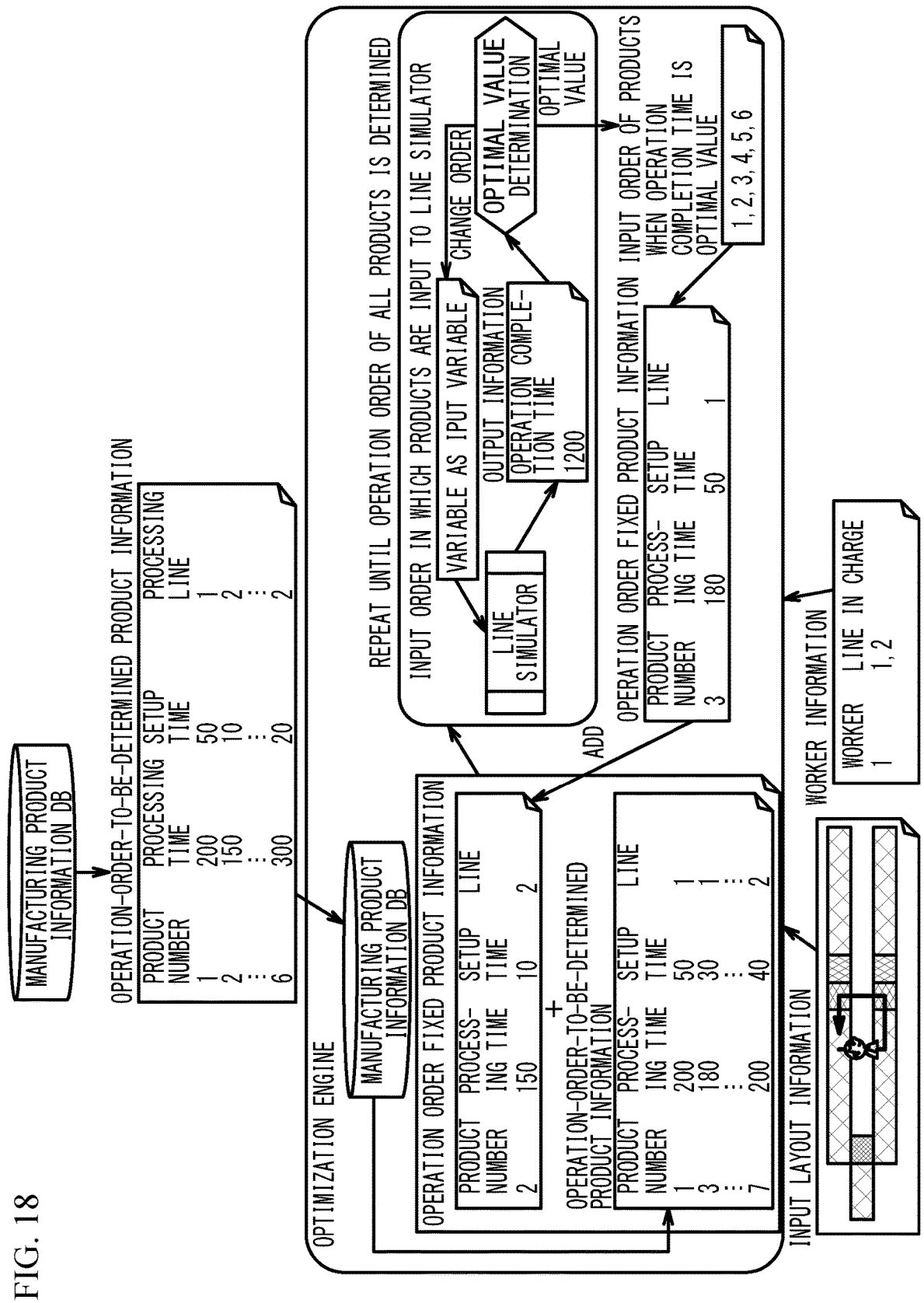
FIG. 18 is a conceptual drawing of the variation.

FIG. 18 illustrates a conceptual drawing m accordance with the present variation. The line simulator 11 illustrated in FIG. 18 is iteratively calculated h the optimization engine. The input variable for this is the input order al products to be determined. The objective function of optimization is the processing completion time Time output from the line simulator 11, and, for example, the input order that minimizes the objective function is determined. The input order having a shorter processing completion time Time output as a result is identical to the order of setup operations, and therefore, the user can obtain the optimal order of setup operations as a result.

In the present variation, the setup operations adjacent to each other are extracted as the rearrangement candidates from the initial input order according to which products are to be input to the processing line including a plurality of lines to which a product that requires a setup operation and a processing operation is to be input, setup operations being not executed with the setup operations overlapped with each other in the plurality of lines. Then, the processing completion time of the processing line after rearrangement is calculated. Among the calculated processing completion times, the order of setup operations that achieves the processing completion time less than the processing completion time of the initial input order is created as planning data. Use of this planning data reduces the processing, completion time. In addition, even when a large number of products are to be input, the processing completion time can be optimized efficiently.

In each of the above examples, the order rearrangement unit 14 functions as an example of a rearrangement unit that rearranges setup operations with respect to the initial input order according to which products are to be input to a processing line including a plurality of lines to which a product that requires a setup operation and a processing operation is to be input, setup operations being not executed with the setup operations overlapped with each other in the plurality of lines. The line simulator 11 functions as an example of a calculation unit that calculates a processing completion time of the processing line after rearrangement by the rearrangement unit. The creation unit 13 functions as an example of a creation unit that creates an order of setup operations that achieves a processing completion time less than a processing completion time of the initial input order among the processing completion time calculated by the calculation unit. The display device 104 functions as an example of a display device that displays the planning data.

The input device 70 functions as an input device, that inputs the products to the processing line according to the planning data created by the creation unit.

All examples and conditional language recited herein are intended for pedagogical purposes to aid the reader in understanding the invention and the concepts contributed by the inventor to furthering the art, and are, to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An information processing device comprising:
   a memory; and
   a processor coupled to the memory and configured to:
   rearrange setup operations with respect to an initial input order according to which products are to be input to a processing line including a plurality of lines to which a product that requires a setup operation and a processing operation is to be input, setup operations being not executed with the setup operations overlapped with each other in the plurality of lines,
   determine a processing completion time of the processing line based on the rearranged setup operations, and
   determine, as planning data, an order of setup operations that achieves a processing completion time less than a processing completion time of the initial input order among the processing completion time calculated,
   each of the plurality of lines is a line in which each of the products moves in a predetermined direction, each of the products does not move and stops when subjected to the processing operation and moves after the processing operation,
   the setup operation is performed when a type of each of the products is changed,
   the processing operation is not performed when subjected to the setup operation,
   each of the products does not move and stops when subjected to the setup operation,
   a time for the setup operation is determined according to the type of the products, and
   when times for the setup operations in the plurality of lines overlap, the setup operations in the plurality of lines are performed in sequence because a worker circulates for performing the setup operations.

2. The information processing device according to claim 1, wherein the processor is configured to determine, as rearrangement candidates, setup operations adjacent to each other based on the initial input order.

3. The information processing device according to claim 1, further comprising a display device that displays the planning data created by the processor.

4. The information processing device according to claim 1, further comprising an input device that inputs the products to the processing line according to the planning data created by the processor.

5. The information processing device according to claim 1, wherein the processor includes a line simulator that reproduces a setup operation time and a processing operation time of each product in the processing line.

6. The information processing device according to claim 5, wherein the line simulator reproduces a setup operation by assuming that a worker circulates for performing a setup operation and the worker is unable to move during a setup operation, and arranging a block that determines a progress of a processing equipment ahead of a block representing the processing equipment and a block representing a setup operation.

7. The information processing device according to claim 5, wherein the line simulator assumes that one worker performs setup operations in the plurality of lines, arranges a setup operation determination block in a part where the plurality of lines branches, and expresses an order of setup operations with use of an input order.

8. The information processing device according to claim 1, wherein
   when each of the products is input to each of the plurality of lines, an order of the products in each of the plurality of products is not changed, and
   the processing operation of each of the plurality of products is completed in the order in each of the plurality of products.

9. A setup operation modification method implemented by a computer, the setup operation modification method comprising:
   rearranging setup operations with respect to an initial input order according to which products are to be input to a processing line including a plurality of lines to which a product that requires a setup operation and a processing operation is to be input, setup operations being not executed with the setup operations overlapped with each other in the plurality of lines;
   determining a processing completion time of the processing line based on the rearranged setup operations; and
   determining, as planning data, an order of setup operations that achieves a processing completion time less than a processing completion time of the initial input order among the processing completion time calculated,
   each of the plurality of lines is a line in which each of the products moves in a predetermined direction, each of the products does not move and stops when subjected to the processing operation and moves after the processing operation,
   the setup operation is performed when a type of each of the products is changed,
   the processing operation is not performed when subjected to the setup operation,
   each of the products does not move and stops when subjected to the setup operation,
   a time for the setup operation is determined according to the type of the products, and
   when times for the setup operations in the plurality of lines overlap, the setup operations in the plurality of lines are performed in sequence because a worker circulates for performing the setup operations.

10. A non-transitory computer-readable recording medium storing a setup operation modification program that causes a computer to execute a process, the process comprising:
    rearranging setup operations with respect to an initial input order according to which products are to be input to a processing line including a plurality of lines to which a product that requires a setup operation and a processing operation is to be input, setup operations being not executed with the setup operations overlapped with each other time in the plurality of lines;

determining a processing completion time of the processing line based on the rearranged setup operations; and determining, as planning data, an order of setup operations that achieves a processing completion time less than a processing completion time of the initial input order among the processing completion time calculated, each of the plurality of lines is a line in which each of the products moves in a predetermined direction, each of the products does not move and stops when subjected to the processing operation and moves after the processing operation, the setup operation is performed when a type of each of the products is changed, the processing operation is not performed when subjected to the setup operation, each of the products does not move and stops when subjected to the setup operation, a time for the setup operation is determined according to the type of the products, and when times for the setup operations in the plurality of lines overlap, the setup operations in the plurality of lines are performed in sequence because a worker circulates for performing the setup operations.

\* \* \* \* \*